United States Patent
Hideshima

(10) Patent No.: US 6,252,646 B1
(45) Date of Patent: Jun. 26, 2001

(54) PHOTOSENSITIVE MATERIAL EXPOSURE APPARATUS

(75) Inventor: Takahiro Hideshima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/479,599

(22) Filed: Jan. 7, 2000

(30) Foreign Application Priority Data

Jan. 8, 1999 (JP) .................................................. 11-003279
Apr. 14, 1999 (JP) .................................................. 11-107091

(51) Int. Cl.[7] .......................... G03B 27/32; G03B 27/52; G03B 29/00
(52) U.S. Cl. ................................. 355/29; 355/40; 355/27
(58) Field of Search ................................. 355/18, 27, 28, 355/29, 40–41; 83/301, 357; 399/385; 358/448; 347/262; 346/154; 270/37; 396/570

(56) References Cited

U.S. PATENT DOCUMENTS

| | | | |
|---|---|---|---|
| 4,122,462 | * 10/1978 | Hirayama et al. | 354/5 |
| 4,456,366 | * 6/1984 | Komiya et al. | 355/8 |
| 4,905,025 | * 2/1990 | Sakamoto et al. | 346/154 |
| 5,181,073 | * 1/1993 | Araki | 355/243 |
| 5,532,809 | * 7/1996 | Hamanaka et al. | 355/308 |
| 5,585,879 | * 12/1996 | Tahara et al. | 396/570 |
| 5,668,588 | * 9/1997 | Morizumi et al. | 342/242 |
| 5,762,329 | * 6/1998 | Nakazato et al. | 270/58.09 |
| 5,839,336 | * 11/1998 | Yamamuchi et al. | 83/167 |
| 5,949,523 | * 9/1999 | Adolphi et al. | 355/28 |
| 5,984,445 | * 11/1999 | Morita et al. | 347/2 |
| 6,027,107 | * 2/2000 | Natsume et al. | 270/37 |
| 6,052,144 | * 4/2000 | Reyner | 347/262 |
| 6,065,379 | * 5/2000 | Shinno et al. | 83/30 |
| 6,065,383 | * 5/2000 | Takaishi et al. | 83/368 |

* cited by examiner

Primary Examiner—Russell Adams
Assistant Examiner—Hung Henry Nguyen
(74) Attorney, Agent, or Firm—Sughrue, Mion, Zinn, Macpeak & Seas, PLLC

(57) ABSTRACT

An image processing apparatus for a photosensitive material, having a simple structure in which an image recording position and a punching position on the photosensitive material can correspond relatively to each other can be obtained, by providing a photosensitive material exposure apparatus which records an image on the photosensitive material by main-scanning the film by an exposure device while sub-scanning the film by winding the photosensitive material around either an exposure drum or a plurality of exposure rollers which is driven and rotated by driving force of a driving device, the photosensitive material exposure apparatus comprising a punching unit, a punching controller, a positioning controller, a guiding controller, and an encoder.

20 Claims, 9 Drawing Sheets

F I G. 1
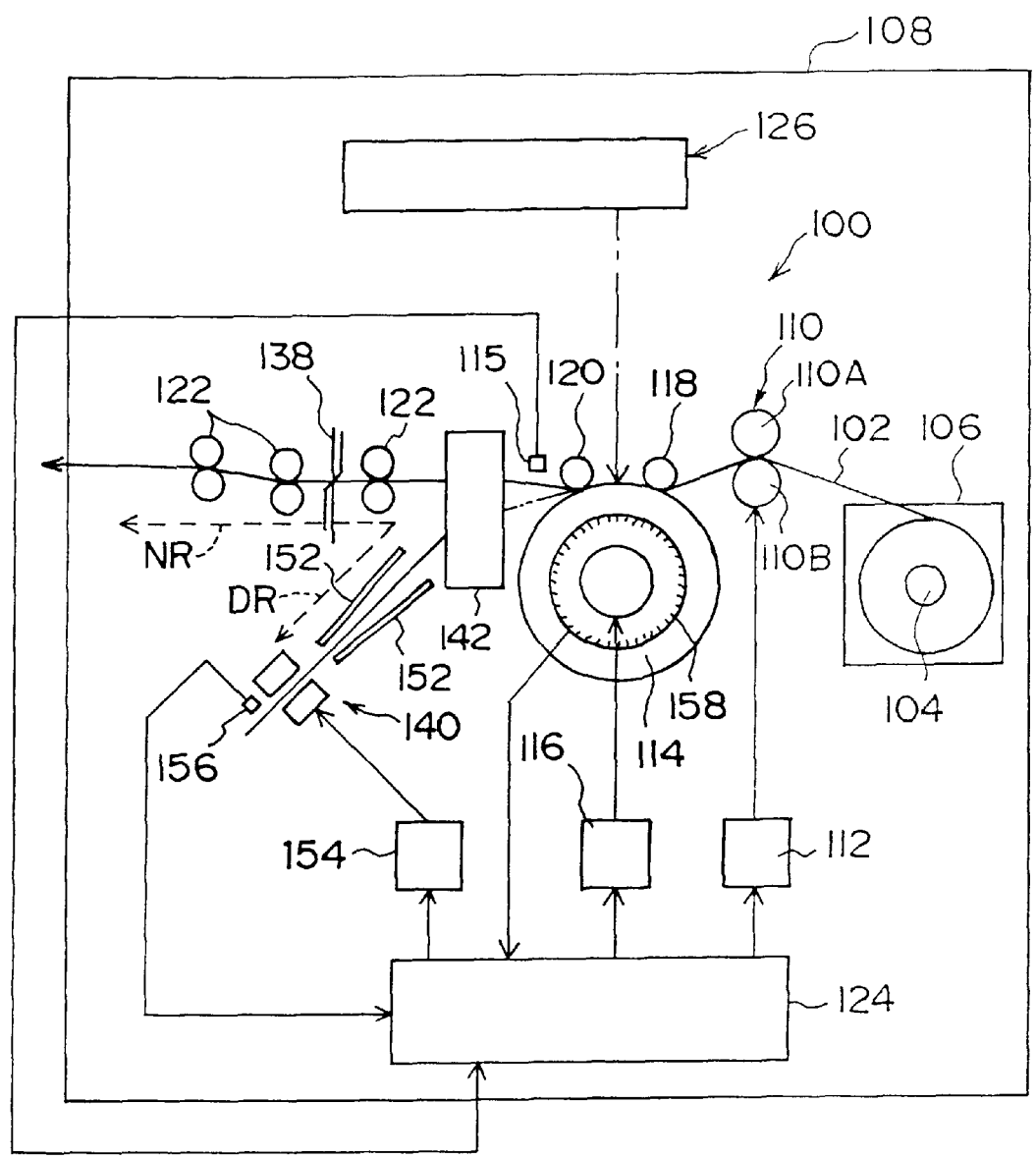

PHOTOSENSITIVE MATERIAL EXPOSURE APPARATUS

BACKGROUND OF THE INVENTION

1. Field of the Invention

The present invention relates to a photosensitive material exposure apparatus, which records an image on the photsensitive material by main-scanning the image by an exposure device, while sub-scanning the photosensitive material by using an exposure drum or plurality of exposure rollers which are driven and rotated by driving force of a driving device.

2. Description of the Related Art

Conventionally, in a case in which an image is recorded on a photosensitive planographic printing plate such as a PS (presensitized) plate, exposure is carried out in a state in which a lithographic film is superposed on top of the photosensitive planographic printing plate.

An image is recorded on the lithographic film by a photosensitive material exposure apparatus which is called a 'film setter', and through a developing process, the image is formed.

A magazine that takes up and accommodates therein an elongated lithographic film in layers is set in this film setter.

The lithographic film that is pulled out from this magazine is wound around an exposure drum. At this time, nip rollers are disposed at two different points on the circumference of the exposure drum. The lithographic film is nipped between the nip rollers and the exposure drum. A predetermined length of the lithographic film is kept in close contact with a portion of a circumferential surface of the exposure drum. The exposure drum is rotated at a predetermined rotational speed by a driving force of a driving device, and this rotation is a sub-scanning movement. An image recording apparatus, which is an exposure device, is disposed in a radial direction of the circumferential surface of the exposure drum, at which the lithographic film is kept in close contact.

In the image recording apparatus, light beams emitted from a laser are scanned in an axial direction of the exposure drum through a plurality of optical systems (main-scanning). Accordingly, main-scanning is carried out repeatedly with the light beams while the lithographic film is sub-scanned. Because the light beams are controlled to be on/off (or duty-controlled) on the basis of image information, a predetermined image can be recorded on the lithographic film.

The lithographic film on which images have been recorded is guided to an ordinary conveying path, is discharged from the film setter, and then is fed to a developer for the next process.

In a case in which a printed material produced by using a photosensitive planographic printing plate is a color image, a photosensitive planographic printing plate must be prepared for each of four color components of C (cyan), M (magenta), Y (yellow), and K (black) with respect to each image (i.e., four photosensitive planographic printing plates).

In positioning these four photosensitive planographic printing plates relatively with each other, a main-scanning starting line on the lithographic film must be positioned accurately. For this reason, holes for positioning these four photosensitive planographic printing plates are punched previously in the lithographic film such that the lithographic film and each of the photosensitive planographic printing plates are superposed relatively to each other on the basis of these punched holes.

In recent years, there has been provided a photosensitive material exposure apparatus which records an image directly on the photosensitive planographic printing plates by using an exposure device. In this case, holes for positioning these photosensitive planographic printing plates to allow the plates to be wound accurately around a printer drum must be punched. When the image is printed, each of the photosensitive planographic printing plates is wound around the printer drum on the basis of the holes punched in the four photosensitive planographic printing plates.

A punching unit for punching these holes is built into the film setter.

However, if the photosensitive material is slackened inside the photosensitive material exposure apparatus during the conveyance thereof, the punched holes and the main-scanning starting line on the photosensitive material may displace from each other by an amount corresponding to the slack. Therefore, in order to have a hole-punching position and a main-scanning starting line position correspond relatively to each other on the photosensitive material in the photosensitive material exposure apparatus, a complicated positioning control becomes necessary.

SUMMARY OF THE INVENTION

In view of the aforementioned facts, it is an object of the present invention to obtain an exposure apparatus for a photosensitive material (for example, a lithographic filmm or a photosensitive planographic printing plate) having a simple structure through which both a main-scanning starting line position and a hole-punching position on the photosensitive material can correspond relatively to each other.

In accordance with a first aspect of the present invention, there is provided a photosensitive material exposure apparatus which records an image on a photosensitive material by main-scanning the film by an exposure device while sub-scanning the photosensitive material by either an exposure drum or a plurality of exposure rollers which is driven and rotated by driving force of a driving device, comprising: a punching unit which is provided along a second path disposed at a downstream side of the exposure drum or the exposure rollers and branching from a first path leading to a latter process, and which punches holes at a leading edge portion of the photosensitive material; a punching controller which is provided at the second path, which has a sensor for detecting the leading edge portion of the photosensitive material, and which controls punching of the punching unit; a positioning controller which positions a main-scanning starting line, which is spaced apart from a hole-punched portion of the photosensitive material at a fixed distance, on the photosensitive material, at an image recording starting position of either the exposure drum or the exposure rollers by conveying the photosensitive material back by reverse rotation of either the exposure drum or the exposure rollers after the holes are punched by the punching controller, and by measuring with an encoder an amount of the photosensitive material conveyed back; a guiding controller which, when it is necessary to punch holes at the leading edge portion of the photosensitive material, guides the photosensitive material to the second path by having the photosensitive material pass without an image recorded thereon at an image recording position of either the exposure drum or the exposure rollers; and an encoder connected to the drum and the positioning controller, the encoder providing a signal for the positioning controller to determine when either the drum or the rollers has rotated the predetermined amount According to the present invention, preferably, the blade is remained in the inserted state for a predetermined period of time after the exposure drum or a set of the exposure rollers is rotated backwards and the positioning controller resets the encoder each time before the blade moves to the retracted state.

According to the present invention, preferably, a driving torque of the exposure drum or the set of exposure rollers is made to be lower than that during normal rotation thereof so as to prevent tension higher than the predetermined threshold from being applied to the photosensitive material.

The photosensitive material passes through a first path and is then discharged therefrom, and thereafter conveyed to a developer for the subsequent process.

In a case in which an image recording mode is for a color image, image recording of the photosensitive material must be performed for each of C, M, Y, and K color components, and holes must be punched in these photosensitive materials for positioning these films relatively to each other.

In this case, the photosensitive material is passed through a first path without recording an image at the image recording position on the exposure drum or the set of exposure rollers by using the image recording apparatus, and is guided to the punching unit.

When a leading edge portion of the photosensitive material is detected by a leading edge portion detective sensor, the conveyance of the photosensitive material is stopped to thereby operate the punching unit so that holes are punched in a vicinity of the leading edge portion of the photosensitive material.

Next, the exposure drum or the set of exposure rollers is made to rotate in reverse, and the main-scanning starting line position on the photosensitive material is returned to an image recording position on the exposure drum or the set of exposure rollers.

The photosensitive material which has been returned to the position of the main-scanning starting line is main-scanned and sub-scanned as described above. Accordingly, images are recorded on the photosensitive material. The photosensitive material is then guided to the first path, and is discharged.

According to the present invention, during reverse rotation of the exposure drum or the set of exposure rollers, while maintaining a state in which the blade by which holes are punched in the photosensitive material is inserted into the punched holes, after the exposure drum or the set of exposure rollers is made to rotate in reverse for a predetermined time, the encoder is reset. Thereafter, slack in the photosensitive material formed between the exposure drum (or the set of exposure rollers) and the punching unit can be tightened by pulling the blade out of the holes. As a result, it becomes possible to measure an amount the photosensitive material conveyed back more accurately.

According to the present invention, in order to tighten slack of the photosensitive material, the exposure drum or the set of exposure rollers is made to rotate in reverse while maintaining a state in which the blade is inserted into the punching holes. Accordingly, when tension higher than a predetermined threshold is applied to the photosensitive material, the photosensitive material may be damaged, or may slide on the exposure drum or between the set of exposure rollers so that abrasions are caused on a surface of the photosensitive material. For this reason, during reverse rotation of the exposure drum or the set of exposure rollers, a driving torque of the exposure drum or the set of exposure rollers is made to be lower than that during normal rotation thereof so as to prevent tension higher than the predetermined threshold from being applied to the photosensitive material. As a result, moderate tension can be applied to the photosensitive material so that slack of the photosensitive material can be tightened, and an amount of the photosensitive material conveyed back can be measured with high accuracy.

BRIEF DESCRIPTION OF THE DRAWINGS

FIG. 1 is a schematic structural view illustrating a film setter according to an embodiment of the present invention.

DESCRIPTION OF THE PREFERRED EMBODIMENTS

Figure 2:
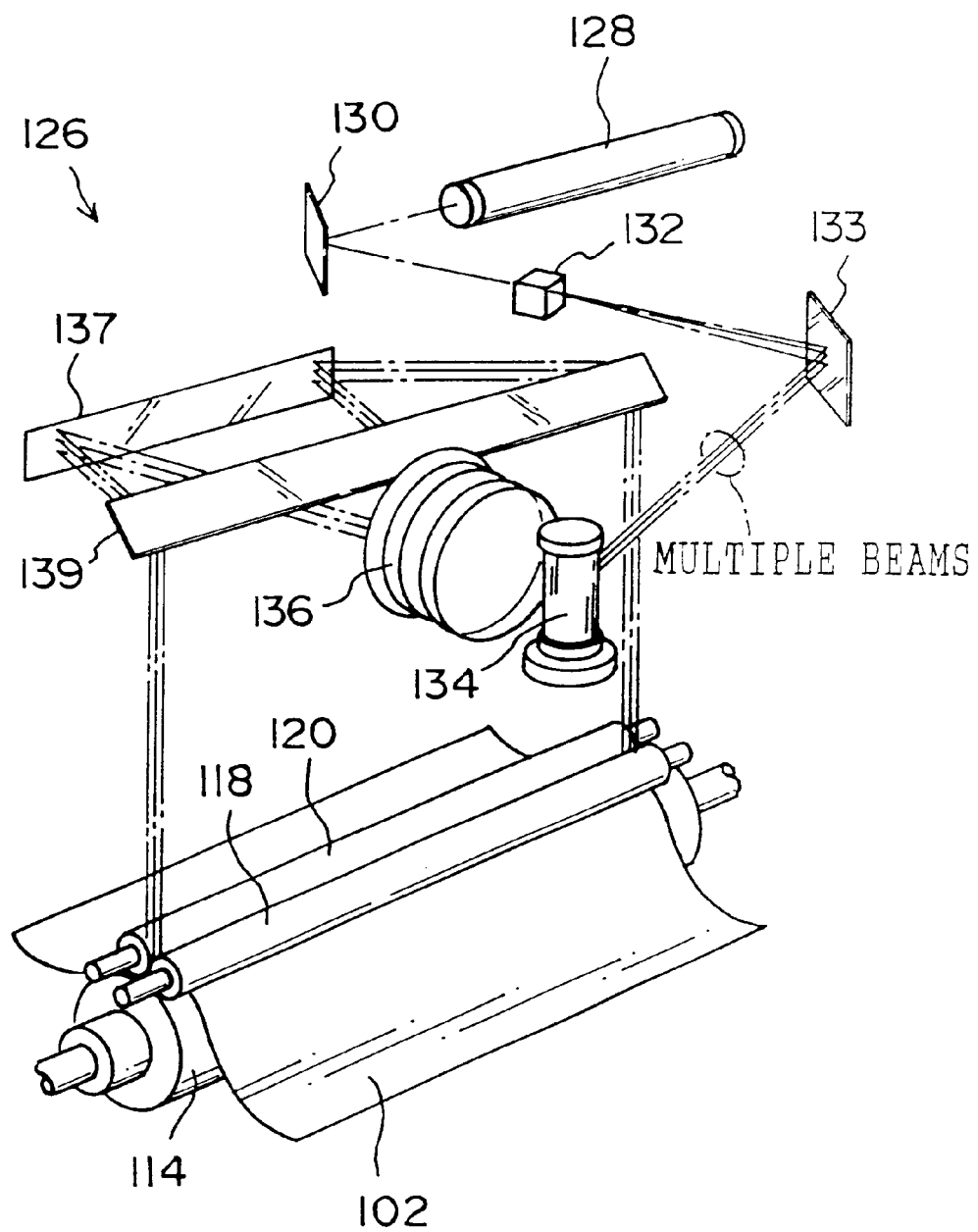
FIG. 2 is a perspective view illustrating an image exposure section.

FIG. 1 shows a schematic structural view of a film setter 100 as a photosensitive material exposure apparatus according to an embodiment of the present invention. The film setter 100 records an image on a lithographic film.

A lithographic film 102 is in an elongated state, is taken up by a reel 104, and is accommodated in a magazine 106. This magazine 106 can be mounted at a predetermined position in an image processing apparatus main body 108.

The lithographic film 102 which is pulled out from the magazine 106 is nipped by a pair of conveying rollers 110A and 110B, which serve as feeding rollers 110.

The roller 110A (or 110B) of the feeding rollers 110 receives a driving force from a motor 112 through unillustrated gear means. The lithographic film 102 is pulled out from the magazine 106 successively by the lithographic film 102 being nipped by these conveying rollers 110A and 110B and then fed to an exposure drum 114.

By receiving a driving force from a motor 116 through the unillustrated gear means, the exposure drum 114 is driven to rotate such that linear velocity of the exposure drum 114 is the same as that of the lithographic film 102 which is conveyed by the feeding rollers 110.

Nip rollers 118 and 120 are disposed respectively at two different positions on a circumferential surface of this exposure drum 114.

The surface of the nip roller 118 is made from a metal. The lithographic film 102, which is fed from the feeding rolers 110, is inserted and nipped between this nip roller 118 and the exposure drum 114. The nipped lithographic film 102 is wound around the circumferential surface of the exposure drum 114. This winding continues to a position where the lithographic film 102 is nipped between the nip roller 120 and the exposure drum 114.

The surface of the nip roller 120 is made from a rubber. The lithographic film 102 is peeled off from the exposure drum 114 between the nip roller 120 and the exposure drum 114, and is fed out to an ordinary conveying path NR formed by a plurality of conveying roller pairs 122 arranged along the ordinary conveying path NR.

The motor 112 and a motor 116 are driven to rotate normally or in reverse on the basis of control signals transmitted from a controller 2124. Namely, ordinarily, due to normal rotation of the exposure drum 114, the lithographic film 102 is received from the feeding roller 110, and fed to the ordinary conveying path NR. However, during reverse rotation of the exposure drum 114, it is also possible to send back the lithographic film 102 in the direction of the feeding rollers 110.

The controller 124 is also able to adjust driving torque of the motor 116 which rotates the exposure drum 114. Namely, the controller 124 controls the motor 116 to rotate with a relatively high torque during its normal rotation and with a relatively low torque during its reverse rotation.

The high torque driving of the motor 116 is not particularly restricted. However, the low torque driving of the motor 116 is set such that, when the lithographic film 102 whose conveyance is restricted is conveyed (in the reverse direction) while being nipped by the nip rollers 118 and 120, the lithographic film 102 is made taut by a predetermined tension force, which is to a degree that avoids damage.

An image recording section 126 is disposed above a portion of the exposure drum 114 around which the lithographic film 102 is wound.

As shown in FIG. 2, the image recording section 126 has a helium neon laser 128 (which is simply referred to as a laser 128 hereinafter).

Image information is stored in the controller 124. On the basis of this image information, the controller 124 controls an AOM (acoustooptic modulator) 132 so as to control the output of a plurality of (flashing) light beams.

A light beam outputted from the laser 128 is transmitted to the AOM 132 by being reflected off a reflecting mirror 130. The AOM 132 separates the transmitted light beam into a plurality of light beams (six in the present embodiment). The separated light beams are inputted to a resonant scanner 134 after being reflected off a reflective mirror 133. This resonant scanner 134 scans these six light beams in a main-scanning direction of the lithographic film 102. The light beams scanned in the main-scanning direction are transmitted through a scanning lens 136 and two reflecting mirrors 137 and 139, and are scanned at the top side of the exposure drum 114. At this point, these six light beams are arranged in the direction the lithographic film 102 is sub-scanned such that an amount corresponding to six main-scanning lines is recorded on the lithographic film 102 for each main scan.

At this time, the exposure drum 114 rotates at a constant speed. Due to this rotation, the lithographic film 102 moves in the sub-scanning direction. For this reason, the lithographic film 102 is sub-scanned such that six main-scanning lines are recorded thereon. By repeating this, an image which is formed on the basis of the image information can be recorded on the lithographic film 102.

A leading edge portion detecting sensor 115 which detects a leading edge portion of the lithographic film 102 in the direction the lithographic film 102 is conveyed is disposed in the vicinity of the exposure drum 114. When this leading edge portion detecting sensor 115 detects a leading edge portion of the lithographic film 102, the lithographic film 102 is judged to have reached a position where an image can be recorded on the lithographic film 102.

Namely, image recording begins when the resonant scanner 134 reaches its initial position, after this leading edge portion detecting sensor 115 has detected the leading edge portion of the lithographic film 102.

A cutter portion 138 is disposed at a point along the ordinary conveying path NR. The cutter portion 138 cuts the lithographic film 102 having images recorded on the exposure drum 114 per predetermined length. Further, the lithographic film 102 which has been cut into a sheet form is discharged from the film setter 100, and is conveyed to a developer (not shown) for subsequent image processing.

The film setter 100 of the present embodiment is equipped with a punching unit 140 which punches holes for positioning.

This punching unit 140 is provided at the downstream side of the exposure drum 114, i. e., at the end of a branch path DR which branches from the ordinary conveying path NR.

The branch path DR starts from a point at which the lithographic film 102 is nipped by the nip roller 120 and the exposure drum 114. At this starting point, in FIG. 1, the branch path DR is formed so as to incline downward slightly from the ordinary conveying path NR (at about 45° in the lower left direction in FIG. 1).

Whether to guide the lithographic film 102 into the ordinary conveying path NR or into the branch path DR depends upon the necessity of the punching holes. Actually, the lithographic film 102 is guided in a desired direction by changing a position of a movable guiding portion 142.

Figure 3A:
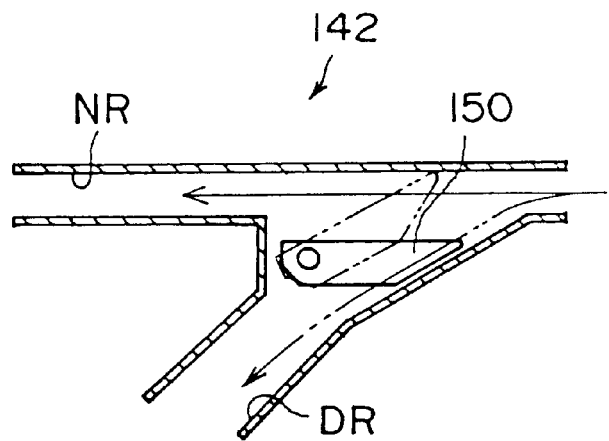
FIG. 3A is a schematic view illustrating an example of a movable guiding portion provided for the present embodiment.

As is shown in FIG. 3A, the movable guiding portion 142 has a switch member 150 whose one end is axially supported so as to be rotatable and which is provided at a branch point between the ordinary conveying path NR and the branch path DR. Either of the ordinary conveying path NR and the branch path DR can be selected by axially rotating this switch member 150.

Figure 3B:
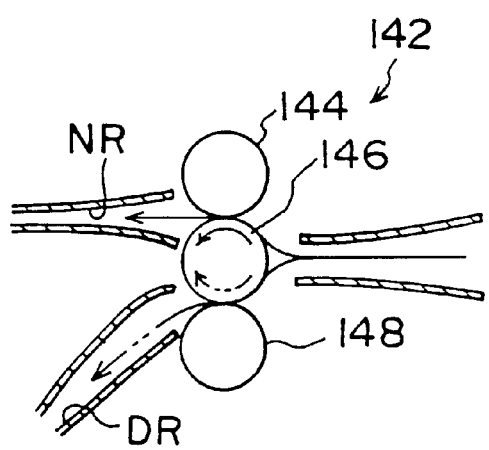
FIG. 3B is a schematic view illustrating a variant example of the movable guiding portion applied to the present embodiment.

The movable guiding portion 142 can have another structure as is shown in FIG. 3B in which the movable guiding portion 142 is formed by three rollers 144, 146, and 148. These three rollers 144, 146, and 148 are lined in a perpendicular direction and contact each other. The intermediate roller 146 can be driven by a driving force to rotate normally or in reverse.

When the lithographic film 102 is guided into the ordinary conveying path NR, the intermediate roller 146 is rotated in a counterclockwise direction. Accordingly, the lithographic film 102 is nipped between the upper roller 144 and the intermediate roller 146, and is guided and conveyed into the ordinary conveying path NR. Further, when the leading edge portion of the lithographic film 102 moves in the downward direction with respect to the intermediate roller 146, the leading edge portion is pushed up in a direction of the intermediate roller 146 due to rotation of the lower roller 148.

On the other hand, when the lithographic film 102 is guided into the branch path DR, the intermediate roller 146 is rotated in a clockwise direction. Accordingly, the lithographic firn 102 is guided into the branch path DR, while being nipped between the lower roller 148 and the intermediate roller 146. Further, when the leading edge portion of the lithographic film 102 moves in the upward direction with respect to the intermediate roller 146, the leading edge portion is pressed down in a direction of the intermediate roller 146 due to rotation of the upper roller 144.

Without using the aforementioned three rollers 144, 146, and 148, the conveying path may be switched like a point switching by moving the movable guiding portion 142.

Guiding plates 152 are disposed along the branch path DR between the exposure drum 114 and the punching unit 140 so that the lithographic film 102 can be reliably conveyed to the punching unit 140.

The punching unit 140 is connected to the controller 124 through a driver 154. A male blade and a female blade are disposed at this punching unit 140. In a state in which the lithographic film 102 is interposed between the male blade and the female blade, the male blade is moved due to driving force of the driver 154 so as to engage with the female blade. Accordingly, punching holes having a predetermined shape (for example, a circular shape) are formed in the lithographic film 102.

A leading edge portion detecting sensor 156 is disposed at the punching unit 140. Punching of holes in the lithographic film 102 is controlled to engage the male blade with the female blade when the leading edge portion detecting sensor 156 detects the leading edge portion of the lithographic film 102.

The state in which the male blade is engaged with the female blade is maintained for a predetermined time, during which the lithographic film 102 is conveyed back due to reverse rotation of the exposure drum 114. Accordingly, slack in the lithographic film 102 between the exposure drum 114 and a portion at which the male blade is engaged with the female blade can be tightened, and the lithographic film 102 is kept in a taut state. Further, in this case, since the exposure drum 114 rotates in reverse with low torque, the lithographic film 102 is prevented from being damaged.

A rotary encoder 158 is mounted to the exposure drum 114. Signals outputted from the rotary encoder 158 are transmitted to the controller 124. The controller 124 resets the signals outputted from the rotary encoder 158 at a point in time when a predetermined time has elapsed after the reverse rotation of the exposure drum is started. Thereafter, the controller 124 counts up to a point at which the leading edge portion of the lithographic film 102 reaches an exposure starting position in the image recording section 126, due to cancellation of the engaged state of the male blade and the female blade.

Next, operation of the present embodiment will be explained with reference to flowcharts of FIGS. 4 to 6.

Figure 4A:
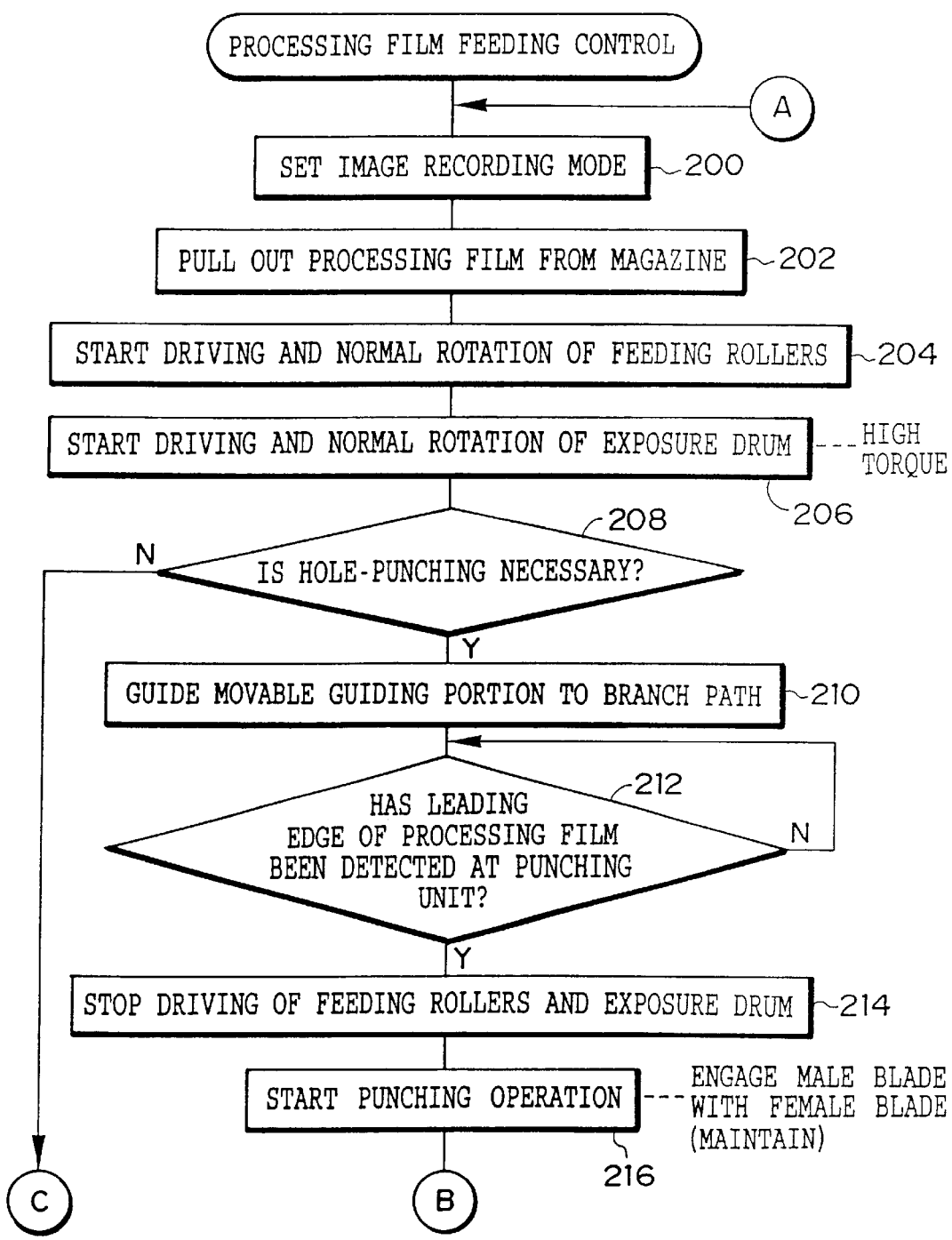
FIG. 4A and FIG. 4B are flowcharts showing feeding control routines of a lithographic film.
Figure 4B:
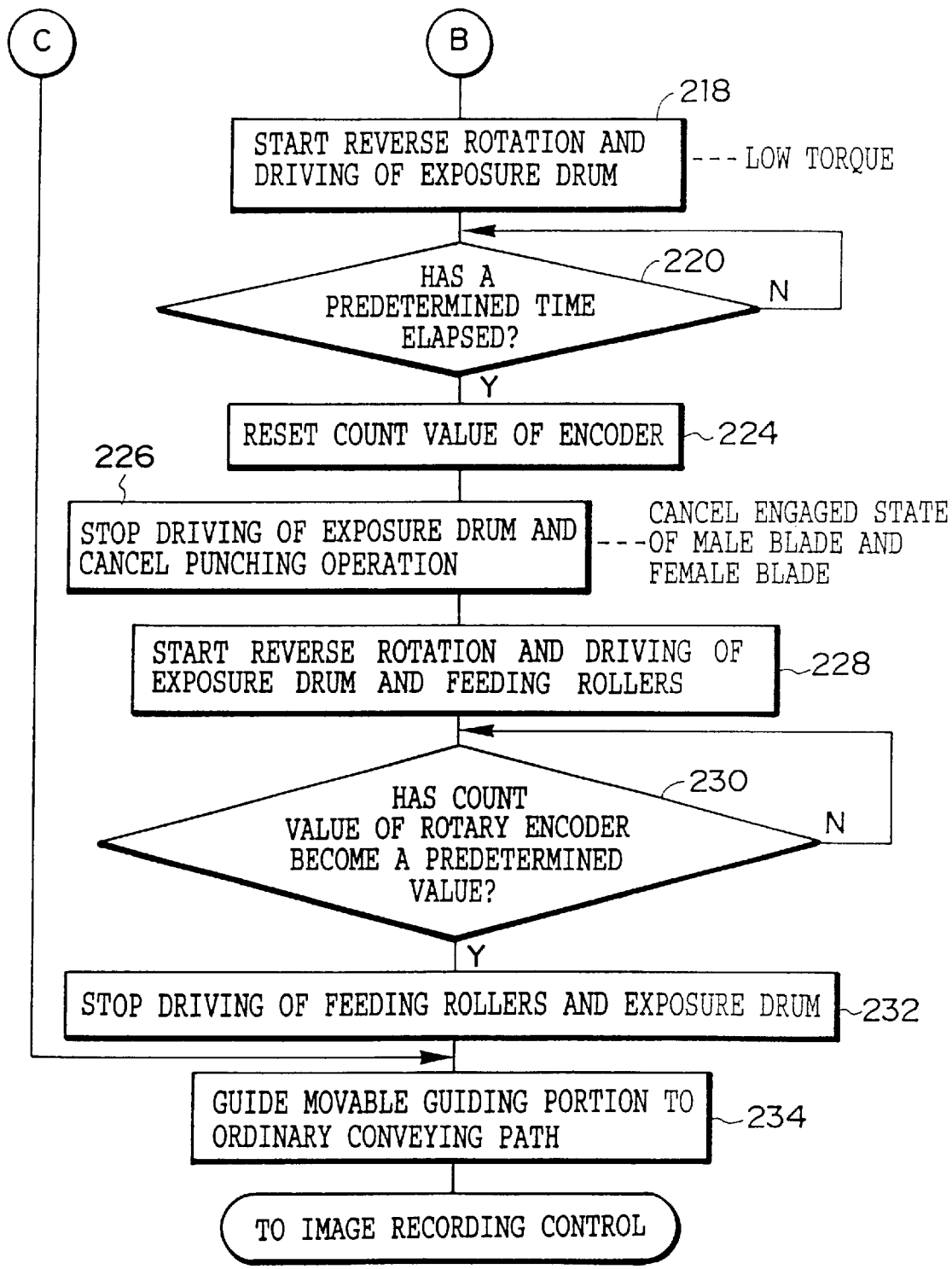

In FIG. 4A, in step 200, a recording mode of an image is inputted with an operation panel or the like (not shown), and is set. This recording mode is to determine whether the image is a monochrome image such as a black and white image or a color image. When it is a monochrome image, it is structured by a sheet of the lithographic film 102. When it is a color image, it is structured by four sheets of the lithographic films 102, i.e., one sheet for each of C, M, Y, and K colors.

In step 202, the lithographic film 102 is pulled out from the magazine 106. Next, in steps 204 and 206, the feeding rollers 110 are driven to rotate normally and the exposure drum 114 is driven to rotate normally.

In step 208, it is determined whether it is necessary to punch holes in the lithographic film 102. Namely, since determination of the necessity of punching holes is performed in order to determine the necessity of positioning four lithographic films 102 relatively to each other in the case of a color image recording mode, this determination depends upon the recording mode set in the step 200.

If punching of holes is judged to be necessary, it is determined that it is a color image recording mode. The routine proceeds to step 210 where the movable guiding portion 142 is guided to the branch path DR.

Accordingly, the lithographic film 102, which is conveyed while being nipped by the feeding rollers 110, and which is wound around a portion of the circumferential surface of the exposure drum 114 by the nip rollers 118 and 120, is conveyed to a terminal end of the branch path DR at which the punching unit 140 is disposed.

In step 212, it is determined whether the leading edge portion of the lithographic film 102 is detected by the leading edge portion detecting sensor 156 provided at the punching unit 140. If the determination is affirmative, the routine proceeds to step 214 where the feeding rollers 110 and the exposure drum 114 are stopped from driving.

In step 216, the male blade is engaged with the female blade so as to punch holes in the lithographic film 102. Further, in the present embodiment, this engaged state of the male blade and the female blade is maintained.

In step 218, the exposure drum 114 is driven to rotate in reverse. At his time, because the male blade is inserted in the punched holes, even when the lithographic film 102 has slack, this slack is tightened so that the lithographic film 102 is set in a taut state.

Further, in the present embodiment, because driving torque of the exposure drum 114 during reverse rotation thereof is made to be low, during the aforementioned taut state of the lithographic film 102, the male blade is prevented from damaging portions around the punched holes, and a predetermined taut state of the lithographic film 102 can be maintained.

After it is judged that a predetermined time has passed in the subsequent step 220, a count value of the rotary encoder 158 is reset in step 224. Namely, because the count value is reset when the lithographic film 102 is in the predetermined taut state between the exposure drum 114 and the punching unit 140, the count value can be reset all the time under the same conditions (at the same position).

In step 226, the exposure drum 114 is stopped from driving, the engaged state of the male blade and the female blade which state is maintained by the male blade being inserted into the punched holes is cancelled (cancellation of the punching operation). In step 228, the exposure drum 114 and the feeding rollers 110 are driven to rotate in reverse.

From the cancellation of the punching operation and while the lithographic film 102 is conveyed back, count is kept with the rotary encoder 158, which is mounted to the exposure drum 114, from the reset state thereof. The lithographic film 102 is conveyed back until this count value amounts to a predetermined value.

In step 230, when it is judged that the count value of the rotary encoder 158 has amounted to the predetermined value, the routine proceeds to step 232 where the feeding rollers 110 and the exposure drum 114 are stopped from being driven to rotate in reverse. Then, the routine proceeds to step 234.

In the step 208, when necessity of the punching operation of holes is judged, that is, if it is a monochrome image recording mode, the routine proceeds from the step 208 to the step 234. In the step 234, the movable guiding portion 142 is set to the side for guiding to the ordinary conveying path, and the routine is shifted to an image recording control which is shown in FIG. 5.

Figure 5:
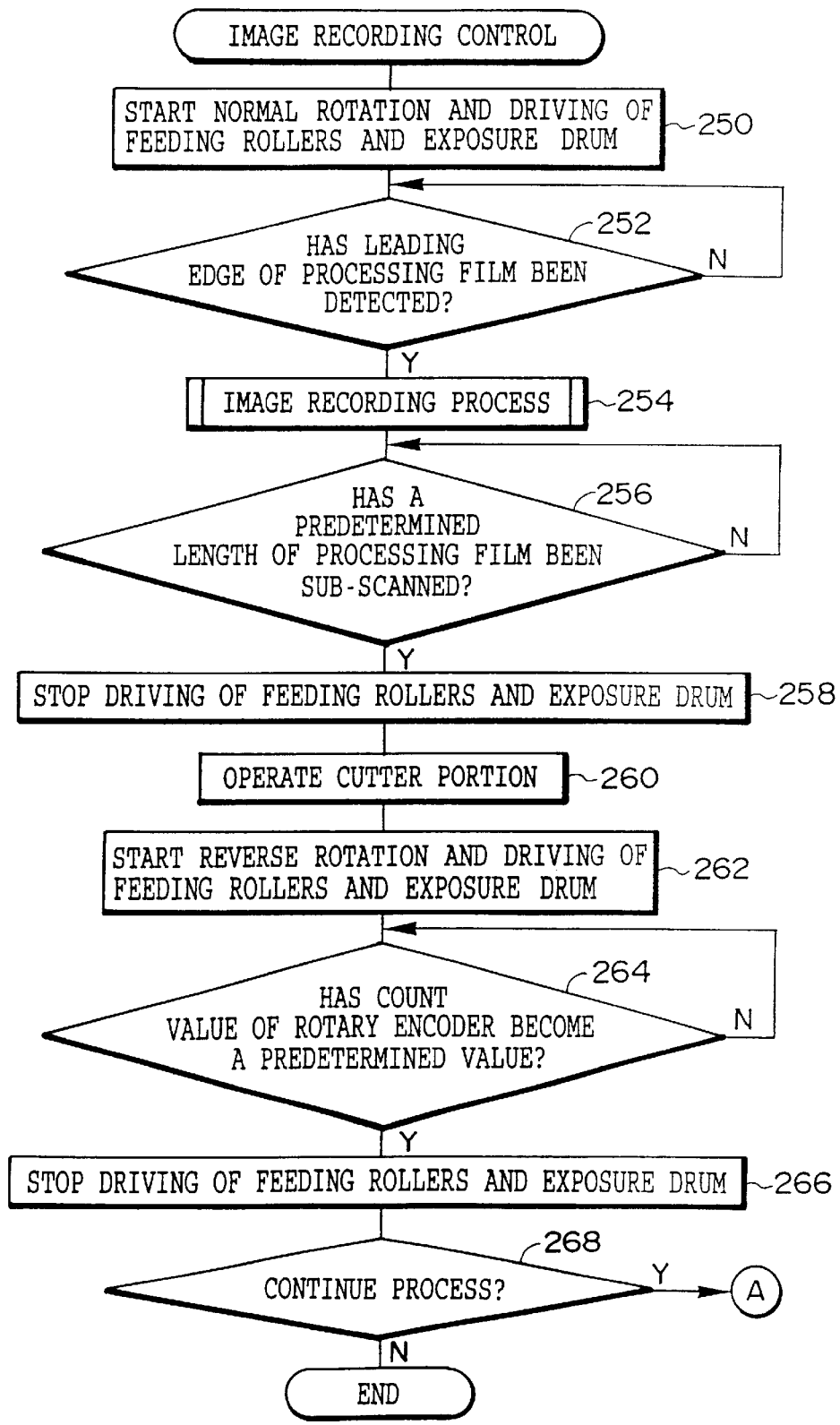
FIG. 5 is a flowchart showing an image recording control routine for the lithographic film.

As is shown in FIG. 5, in step 250, the feeding rollers 110 and the exposure drum 114 are driven to rotate normally. In step 252, it is determined whether the leading edge portion of the lithographic film 102 is detected by the leading edge portion detecting sensor 115 in the vicinity of the exposure drum 114.

If the determination in step 252 is affirmative, it is determined that the leading edge portion of the lithographic film 102 has reached a predetermined position, and in step 254, an image recording process is carried out. In this image recording process, main-scanning of multiple beams (six) is started in synchronization with signals indicating that the resonant scanner 134 has reached to its initial position. Since sub-scanning is always carried out due to driving and rotation of the exposure drum 114, a recording for each image is completed by sequential repetition of the aforementioned main-scanning. Moreover, with reference to FIGS. 6 and 7, this image recording process will be described later.

After completion of the image recording, when a predetermined length (the length needed for sub-scanning) is made to pass (in step 256), namely, when the lithographic film 102 is conveyed a predetermined amount, the feeding rollers 110 and the exposure drum 114 are stopped from driving (step 258). In step 260, the cutter portion 138 is operated so as to cut the lithographic film 102 into a sheet-form with one image.

The lithographic film 102 which has been cut into a sheet-form is conveyed while being nipped by the pair of conveying rollers 122, and is discharged from the film setter 100.

On the other hand, in step 262, the remaining lithographic film (the longer one) 102 is conveyed back by the feeding rollers 110 and the exposure drum 114 being driven to rotate in reverse.

In step 264, it is determined whether the count value of the rotary encoder 158 in accordance with the reverse conveyance of the lithographic film 102 amounts to a predetermined value. If the determination is affirmative in the step 264, it is determined that the lithographic film 102 has reached the same position as that in the step 230 of FIG. 4B. Thereafter, in step 266, the feeding rollers 110 and the exposure drum 114 are stopped from being driven to rotate in reverse.

In step 268, it is determined whether to continue the image recording process, and if it is to be continued, the routine returns to the step 200 of FIG. 4A. If the process is not to be continued, the routine is finished.

Figure 6:
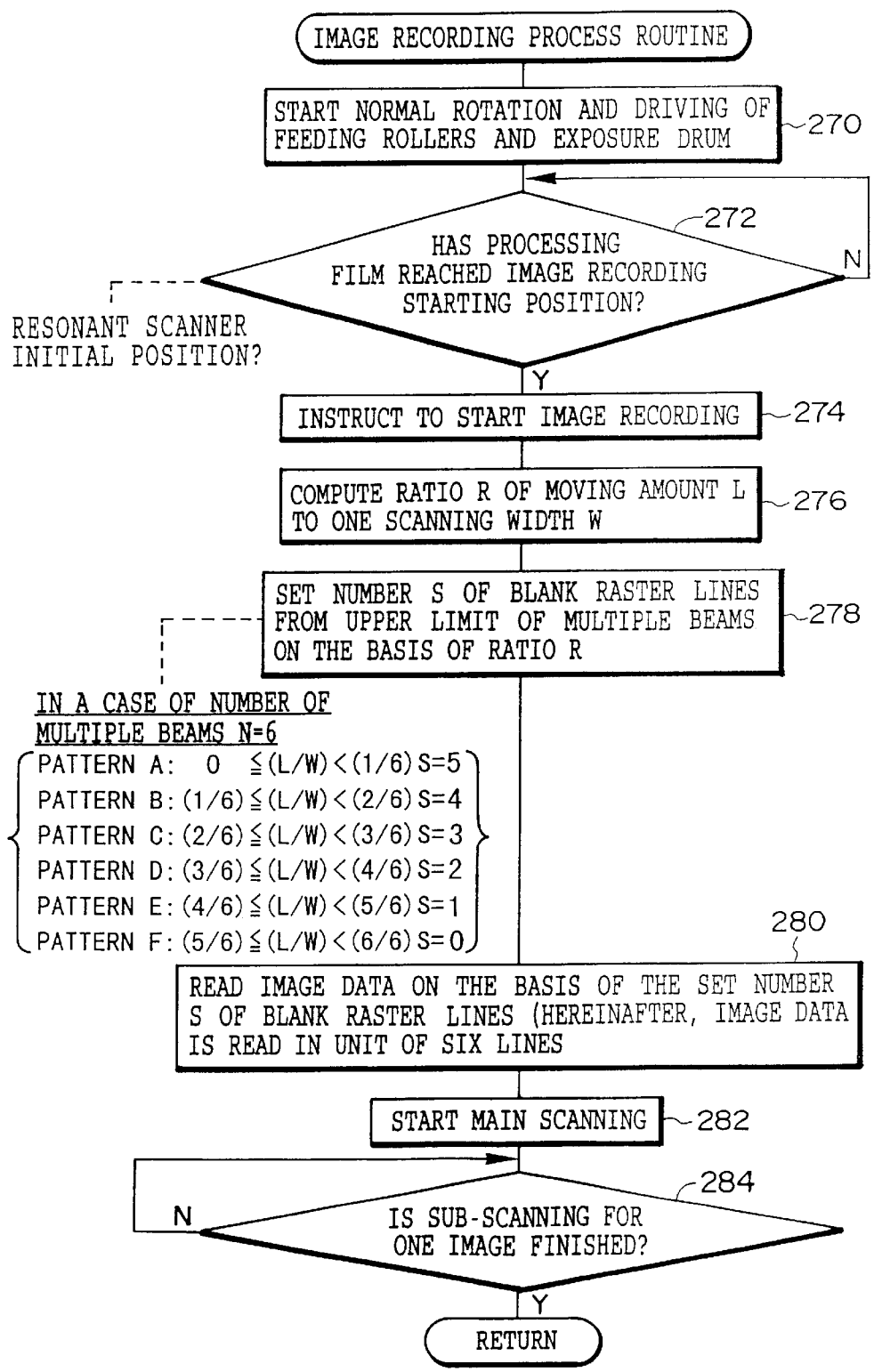
FIG. 6 is a flowchart showing a sub-routine representing details of the image recording control routine during image recording.

A sub-routine of the image recording process is shown in FIG. 6.

In step 270, the feeding rollers 110 and the exposure drum 114 are driven to rotate normally. In step 272, it is determined whether the leading edge portion of the lithographic film 102 has reached a position of a main-scanning starting line.

If the determination is affirmative in the step 272, a signal that instructs to start image recording is outputted (in step 274).

In step 276, a ratio R (R=L/W) of a moving amount L to a sub-scanning width W (which is a sub-scanning dimension moved during each main-scan) is computed with respect to a time difference between an output of a signal indicating a start of image recording and an output of a signal indicating an arrival of the scanner 134 to its initial position. Next, in step 278, in accordance with this ratio (R), the number S of blank raster lines from the upper limit of the multiple beams (the uppermost line) is set.

In step 280, image data is read on the basis of the set number S of the blank raster lines.

While the lithographic film 102 is waiting for the scanner 134 to reach its initial position, the lithographic film 102 moves at most by a moving amount W per one sub-scan. For this reason, an image writing starting position deviates greatly between cases with the best timing for image recording (i.e., when a time difference between the output of the signal indicating the start of image recording and the output of the signal indicating the arrival of the scanner 134 to its initial position is the shortest), and cases with the worst timing for image recording (i.e., when a time difference between the output of the signal indicating the start of image recording and the output of the signal indicating the arrival of the scanner 134 to its initial position is the longest). In the present embodiment in which the number S of multiple beams is six, deviation occurs in an amount corresponding to six lines.

The width of a line scanned by main-scanning is about 10 $\mu$m. The allowable range of color deviation of a printed material is limited to 100 $\mu$m. If this deviation caused at the beginning of image recording is so large as to occupy most of the allowable range of deviation, and if there is another cause for deviation (such as positioning displacement among four lithographic films 102), the total amount of deviation becomes more than this allowable range, thereby causing quality of the finished image to decrease.

Therefore, in the present embodiment, on the basis of the ratio R (=L/W), the number of lines that is formed by a normal line is made to be only the lower limit of the lines (the lowermost line), and the other lines are made to be the blank raster lines. Accordingly, deviation of the image writing starting position is controlled to deviate one line at maximum from the upper limit of the multiple beams (the uppermost line) which is written one line behind at maximum.

Figure 7:
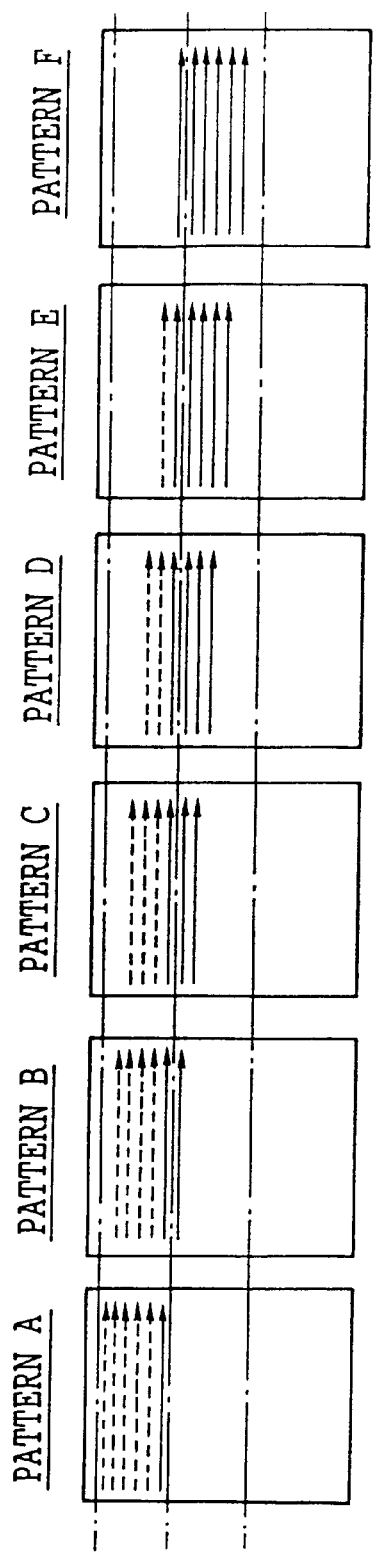
FIG. 7 is an explanatory diagram showing a plurality of patterns for determining the number S of blank raster lines at the initial stage of main-scanning.

As is shown in FIG. 7, a pattern A represents a case in which the resonant scanner 134 reaches its initial position directly after the leading edge portion of the lithographic film 102 has reached a position of the main-scanning starting line, thus representing a most appropriate positional relationship of the multiple beams. For this reason, six lines of the multiple beams can be written from the position of the main-scanning starting line of the lithographic film 102. However, in the present embodiment, even in this case, five multiple beams are made to be the blank raster lines, and images are recorded only by writing the lowermost line (a single line) of the multiple beams.

Patterns B to E are cases in which a time during which the leading edge portion of the lithographic film 102 has reached the main-scanning starting line position and the resonant scanner 134 reaches its initial position is divided in stages, and the number S of the blank raster lines is determined on the basis of each of the regions of the patterns B to F. Namely, the shorter the time difference between the output of the signal indicating the start of image recording and the output of the signal indicating the arrival of the scanner to its initial position, the greater the number S of the blank raster lines. Meanwhile, the longer the time difference between the output of the signal indicating the start of image recording and the output of the signal indicating the arrival of the scanner to its initial position, the fewer the number S of the blank raster lines.

On the other hand, the pattern F is a case in which the resonant scanner 134 reaches its initial position just before the leading edge portion of the lithographic film 102 reaches the main-scanning starting line position. However, it takes a long time until the lithographic film 102 is conveyed to the next image writing starting position, and distance of a region in which the lithographic film 102 is conveyed in a sub-scanning direction is the longest. In this case, an image is recorded by fully one main-scanning time behind substantially.

The pattern A has the maximum value (N−1) of the number S of the blank raster lines. Thereafter, regions for the patterns B to F are set, the number S of the blank raster lines is reduced one by one, and image is recorded on the remaining line on the basis of image data. As a result, even if image recording is performed in any patterns from A to F, the image is recorded while restricting deviation of the multiple beams to one line at maximum.

As is shown in FIG. 6, in step 282, main-scanning is started. However, in the lithographic film 102, since the number S of the blank raster lines is determined by any of the aforementioned patterns from A to F, and main-scanning at the initial stage is carried out, deviation among four lithographic films 102 becomes a width of one line at maximum, and does not occur at an amount greater than one line. As a result, decrease of image quality, such as color deviation, can be reduced. Since color deviation is reduced, it is possible to increase the allowable range of deviation caused by other factors (e.g., positioning displacement of punching holes) to a certain degree, and the amount of allowable deviation of 100 μm can be utilized effectively.

An image is recorded on the lithographic film 102 as having the number of raster lines corresponding to that of a plurality of light beams per one main-scanning. The main-scanning is finished when all of the raster lines corresponding to an image area are recorded on the lithographic film 102. At this time, all of the plurality of the light beams do not necessarily form image data. In the final main-scanning, a necessary number of light beams alone are controlled to be on/off on the basis of image data. The remaining light beams are set as the blank raster lines having non-image data formed thereon. In step 284, it is determined whether or not an image corresponding to an image area has been recorded on the lithographic film 102. If the determination is affirmative, this routine is finished.

As an embodiment of the present invention, a description of a film setter which records an image on an elongated lithographic film has been given. However, the present invention is not limited to an elongated photosensitive material, and instead, can be applied to a sheet-type photosensitive material (lithographic film or photosensitive planographic printing plate). In this case, a distance between the punching unit and the exposure drum or the exposure roller is limited to be less than a length of the sheet-type photosensitive material in a sub-scanning direction thereof. The reason for such a limitation is that when the distance between the exposure drum or the exposure roller and the punching unit exceeds a length of the sheet-type photosensitive material in the sub-scanning direction thereof, when holes are punched at the leading edge portion of the photosensitive material in the punching unit, the rear end portion of the photosensitive material deviates from the exposure drum or the exposure roller, thus making it difficult to convey the photosensitive material with high accuracy.

Figure 8:
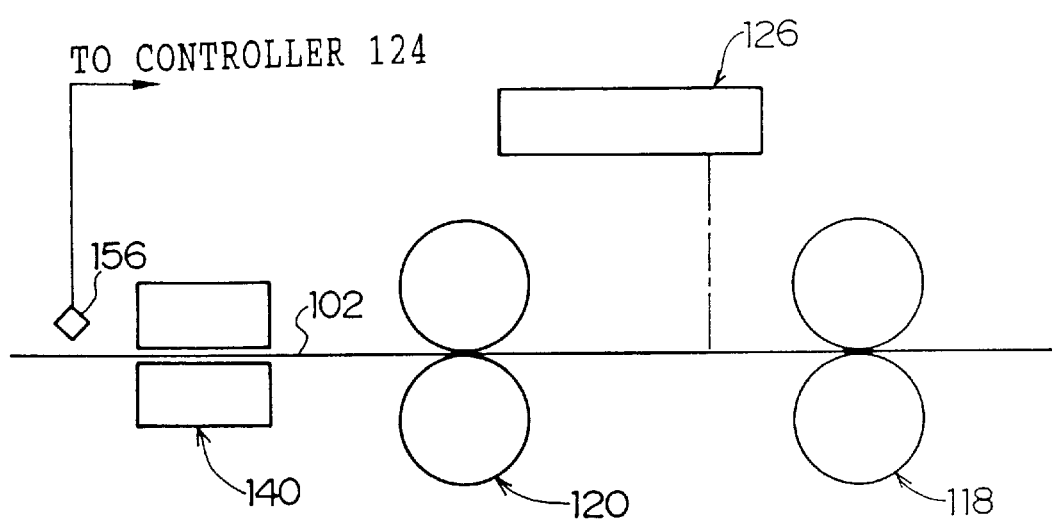
FIG. 8 is a schematic view illustrating a case of a planar exposure type image recording of the lithographic film.

FIG. 8 shows another embodiment of the present invention in which a punching unit is provided at a conveying path for the photosensitive material at a downstream side of the exposure drum or the exposure roller. The punching unit punches holes at a leading edge portion of the photosensitive material.

What is claimed is:

1. A photosensitive material exposure apparatus which records an image on a photosensitive material by main-scanning the photosensitive material by an exposure device while sub-scanning the photosensitive material by an exposure drum which is driven and rotated by a driving force of a driving device, comprising:

a punching unit which is provided along a second path disposed at a downstream side of said exposure drum and branching from a first path leading to a subsequent process, said punching unit which punches holes at a leading edge portion of said photosensitive material;

a punching controller which controls punching of said punching unit, said punching controller which is provided along the second path, and which has a sensor for detecting the leading edge portion of said photosensitive material so that said punching is instituted;

a positioning controller which positions a main-scanning starting line being spaced apart from a hole-punched portion of said photosensitive material at a fixed distance, on said photosensitive material, at an image recording starting position of said exposure drum by conveying said photosensitive material back by reverse rotation of said exposure drum after the holes are punched by said punching controller, and by measuring with an encoder a predetermined amount of said photosensitive material conveyed back;

a guiding controller which, when it is necessary to punch holes at the leading edge portion of the photosensitive material, guides the photosensitive material to the second path by having the photosensitive material pass without an image recorded thereon at an image recording position of the exposure drum; and an encoder mounted to the drum and connected to the positioning controller, the encoder providing a signal for the positioning controller to determine when the drum has rotated the predetermined amount.

2. A photosensitive material exposure apparatus according to claim 1, wherein the punching unit has a guiding control device which, when it is necessary to punch holes at the leading edge portion of the photosensitive material, guides the photosensitive material from the second path to the punching unit by having the photosensitive material pass without an image recorded thereon at the image recording position of the exposure.

3. A photosensitive material exposure apparatus according to claim 1, wherein one of the members of the punching unit is a blade movable between a retracted state and an inserted state, the blade penetrating the photosensitive material in the inserted state for punching a hole in the photosensitive material, the blade remaining in the inserted state for a predetermined period of time after said exposure drum is rotated backwards, and wherein the positioning controller is connected to the punching controller, with the positioning controller resetting the encoder each time after said predetermined period of time has passed.

4. A photosensitive material exposure apparatus according to claim 1, further comprising a switch member movable in two directions and defining the first path of travel for the photosensitive material when the switch member is moved in one direction, and the second path of travel for the photosensitive material when the switch member is moved in the other direction.

5. A photosensitive material exposure apparatus according to claim 2, wherein one of the members of the punching unit is a blade movable between a retracted state and an inserted state, the blade penetrating the photosensitive material in the inserted state for punching a hole in the photosensitive material, the blade remaining in the inserted state for a predetermined period of time after said exposure drum is rotated backwards, and wherein the positioning controller is connected to the punching controller, with the positioning controller resetting the encoder each time after said predetermined period of time has passed.

6. A photosensitive material exposure apparatus according to claim 2, further comprising a switch member movable in two directions and defining the first path of travel for film when the switch member is moved in one direction, and the second path of travel for the film when the switch member is moved in the other direction.

7. A photosensitive material exposure according to claim 3, wherein the positioning controller sends signals to a motor to rotate the drum backwards with less torque than when the positioning controller sends signals to rotate the drum forward, so that slack in the photosensitive material between the drum and the blade of the punching unit is tightened, and a resulting tension applied to the photosensitive material when the motor rotates backward does not exceed a predetermined threshold.

8. A photosensitive material exposure apparatus according to claim 7, wherein said exposure device is structured by a laser light source, a plurality of reflecting mirrors, an acoustooptic modulator, a resonant scanner, and a scanning lens.

9. A photosensitive material exposure apparatus according to claim 4, wherein said switch member comprises a guiding plate whose one end is axially supported so as to be able to rotate.

10. A photosensitive material exposure apparatus according to claim 4, wherein said switch member comprises three rollers which are arranged to have mutual contact in a direction intersecting the first path, and said photosensitive material is guided to the first path by rotating an intermediate roller in a forward direction, and said photosensitive material is guided to the second path by rotating said intermediate roller in a reverse direction.

11. A photosensitive material exposure apparatus according to claim 4, wherein said photosensitive material exposure apparatus further comprises:

a first sensor which is provided on the first path at an upstream side of said switch member in a direction the photosensitive material is conveyed, and which detects the leading edge portion of said photosensitive material; and a second sensor which is provided on the second path at a downstream side of said punching unit in the direction said photosensitive material is conveyed, and which detects the leading edge portion of said photosensitive material.

12. A photosensitive material exposure apparatus according to claim 11, wherein, on the basis of a leading edge portion detecting signal outputted from said first sensor which detects the leading edge portion of said photosensitive material, said exposure device is driven so as to begin recording an image on said photosensitive material.

13. A photosensitive material exposure apparatus according to claim 11, wherein, on the basis of a leading edge portion detecting signal transmitted from said second sensor which detects the leading edge portion of said photosensitive material, said punching unit is driven so as to begin hole-punching in said photosensitive material.

14. A photosensitive material exposure apparatus which records an image on a photosensitive material by main-scanning the photosensitive material by an exposure device while sub-scanning the photosensitive material by a plurality of exposure rollers which is driven and rotated by driving force of a driving device, comprising:

a punching unit which is provided along a second path disposed at a downstream side of said plurality of exposure rollers and branching from a first path leading to a subsequent process, said punching unit which punches holes at a leading edge portion of said photosensitive material;

a punching controller which controls punching of said punching unit, said punching controller which is provided along the second path, and which has a sensor for detecting the leading edge portion of said photosensitive material so that said punching instituted, and which controls punching of said punching unit;

a positioning controller which positions a main-scanning starting line being spaced apart from a hole-punched portion of said photosensitive material at a fixed distance, on said photosensitive material, at an image recording starting position of the exposure rollers by conveying said photosensitive material back by reverse rotation of the exposure rollers after the holes are punched by said punching controller, and by measuring with an encoder a predetermined amount of said photosensitive material conveyed back;

a guiding controller which, when it is necessary to punch holes at the leading edge portion of the photosensitive material, guides the photosensitive material to the second path by having the photosensitive material pass without an image recorded thereon at an image recording position of the exposure rollers; and an encoder mounted to the rollers and connected to the positioning controller, the encoder providing a signal for the positioning controller to determine when the rollers have rotated the predetermined amount.

15. A photosensitive material exposure apparatus according to claim 14, wherein the punching unit has a guiding control device which, when it is necessary to punch holes at the leading edge portion of the photosensitive material, guides the photosensitive material from the second path to the punching unit by having the photosensitive material pass without an image recorded thereon at the image recording position of the exposure rollers.

16. A photosensitive material exposure apparatus according to claim 14, wherein one of the members of the punching unit is a blade movable between a retracted state and an inserted state, the blade penetrating the photosensitive material in the inserted state for punching a hole in the photosensitive material, the blade remaining in the inserted state for a predetermined period of time after said plurality of exposure rollers are rotated backwards, and wherein the positioning controller is connected to the punching controller, the positioning controller resetting the encoder each time after said predetermined period of time has passed.

17. A photosensitive material exposure apparatus according to claim 14, further comprising a switch member movable in two directions and defining the first path of travel for the photosensitive material when the switch member is moved in one direction, and the second path of travel for the photosensitive material when the switch member is moved in the other direction.

18. A photosensitive material exposure apparatus according to claim 16, wherein the positioning controller sends signals to a motor to rotate the plurality of exposure rollers backwards with less torque than when the positioning controller sends signals to rotate the exposure rollers forward, so that slack in the photosensitive material between the drum and the blade of the punching unit is tightened, and a resulting tension applied to the when the motor rotates backward does not exceed a predetermined threshold.

19. A photosensitive material exposure apparatus according to claim 15, wherein one of the members of the punching unit is a blade movable between a retracted state and an inserted state, the blade penetrating the photosensitive material in the inserted state for punching a hole in the photosensitive material, the blade remaining in the inserted state for a predetermined period of time after said exposure rollers are rotated backwards, and wherein the positioning controller is connected to the punching controller, with the positioning controller resetting the encoder each time after said predetermined period of time has passed.

20. A photosensitive material exposure apparatus according to claim 17, wherein said photosensitive material exposure apparatus further comprises:

a first sensor which is provided on the first path at an upstream side of said switch member in a direction the photosensitive material is conveyed, and which detects the leading edge portion of said photosensitive material; and a second sensor which is provided on the second path at a downstream side of said punching unit in the direction said photosensitive material is conveyed, and which detects the leading edge portion of said photosensitive material.

* * * * *